United States Patent
Sahin et al.

(10) Patent No.: US 11,451,174 B2
(45) Date of Patent: Sep. 20, 2022

(54) METHOD OF REDUCING ESTIMATION VECTORS IN A MODEL PREDICTIVE CONTROL OF ALTERNATING CURRENT MOTORS

(71) Applicant: ORTA DOGU TEKNIK UNIVERSITESI, Ankara (TR)

(72) Inventors: Ilker Sahin, Ankara (TR); Ozan Keysan, Ankara (TR)

(73) Assignee: ORTA DOGU TEKNIK UNIVERSITESI, Ankara (TR)

( * ) Notice: Subject to any disclaimer, the term of this patent is extended or adjusted under 35 U.S.C. 154(b) by 0 days.

(21) Appl. No.: 17/272,676

(22) PCT Filed: Oct. 2, 2019

(86) PCT No.: PCT/TR2019/050818
§ 371 (c)(1),
(2) Date: Mar. 2, 2021

(87) PCT Pub. No.: WO2020/072020
PCT Pub. Date: Apr. 9, 2020

(65) Prior Publication Data
US 2021/0344292 A1    Nov. 4, 2021

(30) Foreign Application Priority Data
Oct. 3, 2018    (TR) ................................. 2018/14498

(51) Int. Cl.
*H02P 21/00* (2016.01)
*H02P 21/14* (2016.01)
*H02P 27/06* (2006.01)

(52) U.S. Cl.
CPC .......... *H02P 21/0017* (2013.01); *H02P 21/14* (2013.01); *H02P 27/06* (2013.01); *H02P 2207/01* (2013.01)

(58) Field of Classification Search
CPC ...... H02P 21/0017; H02P 21/14; H02P 27/06; H02P 2207/01; H02P 23/0077; H02P 23/0004; H02M 7/53873; H02M 7/53876
See application file for complete search history.

(56) References Cited

U.S. PATENT DOCUMENTS

2020/0350847 A1* 11/2020 Geyer ................... H02M 7/487

FOREIGN PATENT DOCUMENTS

| CN | 104242768 A | 12/2014 |
|---|---|---|
| CN | 106712555 A | 5/2017 |

OTHER PUBLICATIONS

M. Habibullah, D. D.-C. Lu, D. Xiao, and M. F. Rahman, "A Simplified Finite-State Predictive Direct Torque Control for Induction Motor Drive," IEEE Trans. Ind. Electron., vol. 63, No. 6, pp. 3964-3975, 2016.*

(Continued)

*Primary Examiner* — Bickey Dhakal
*Assistant Examiner* — Bradley R Brown
(74) *Attorney, Agent, or Firm* — Bayramoglu Law Offices LLC

(57) ABSTRACT

A method for reducing a total operational load of a method of a model predictive control-by conducting simplifications based on specific observations, in order to drive alternating current motors by using the method of the MPC with a two-level voltage source inverter. The method includes the steps of determining at which one of the predefined sectors a resultant of stator currents is present, determining a motor mode, reducing seven estimation vectors to four estimation vectors and calculating a cost function or reducing seven estimation vectors to five estimation vectors and calculating the cost function.

3 Claims, 5 Drawing Sheets

(56) References Cited

OTHER PUBLICATIONS

F. Wang, Z. Zhang, A. Davari, J. Rodriguez, and R. Kennel, "An experimental assessment of finite-state Predictive Torque Control for electrical drives by considering different online-optimization methods," Control Eng. Pract., vol. 31, pp. 1-8, 2014.*

Ilker Sahin, et al., A New Model Predictive Torque Control Strategy with Reduced Set of Prediction Vectors, 2018 IEEE 12th International Conference on Compatibility, Power Electronics and Power Engineering (CPE—POWERENG 2018), 2018, XP033353572.

* cited by examiner

METHOD OF REDUCING ESTIMATION VECTORS IN A MODEL PREDICTIVE CONTROL OF ALTERNATING CURRENT MOTORS

CROSS REFERENCE TO THE RELATED APPLICATIONS

This application is the national stage entry of International Application No. PCT/TR2019/050818, filed on Oct. 2, 2019, which is based upon and claims priority to Turkish Patent Application No. 2018/14498, filed on Oct. 3, 2018, the entire contents of which are incorporated herein by reference.

TECHNICAL FIELD

The invention relates to a novel method for reducing the total operational load of the method of model predictive control (MPC) by conducting simplifications based on specific observations, in order to drive asynchronous motors by using the method of MPC with a two-level voltage source inverter (2L-VSI).

BACKGROUND

Nowadays, in most of the high performance motor drive applications, field oriented control (FOC) technique is being used. The drivers for alternating current motors have a huge market across the globe. When excluding high power engines (>250 kW), the most widely used power cycle topology as a motor driver is the two-level voltage source inverters (2L-VSI). The structure of the 2L-VSI with DA busbar, Phase A, Phase B, Phase C is shown in FIG. 1. To perform controlling of the structure of the 2L-VSI used as a motor driver, suitable signals are transmitted to the semiconductor switches that form the 2L-VSI depending on the current instantaneous conditions and control targets (speed, torque, position and etc. desired from the motor) and thereby control is ensured. In accordance with this aim, a great number of motor driver control methods have been developed since the concept of power electronics emerged. As an example of the control methods that have already been in use as an industry standard, "field oriented control" and "direct torque control" may be given.

The MPC method that dates back to the '60s has mostly been used in the petrochemical industry until now. It has only been possible to use said method in the electronic applications which demand much quicker control due to their nature with the development of powerful and quick microprocessors. It is therefore a new technique to use the MPC method in power electronic converters and academic studies aimed at this matter have gained acceleration particularly in the last decade. Although the fact that modern microprocessors have rapid and high capacity of processing allows us to use the MPC method in power electronic applications, the intense process load resulted from the MPC method still constitutes the most severe drawback of said technique. The most fundamental problem of the MPC method to be improved in order to replace the methods currently used in the industry is the high cost of processing of said method. To perform the method, higher amounts of processes need to be carried out compared to other alternatives (even if they are simple). It will introduce quite strict restrictions on control frequency (it means at least how many times can a control algorithm operate per micro second) and control horizon (it means up to how many steps ahead can the control algorithm calculate).

SUMMARY

The present invention relates to the method of reducing estimation vectors in the model predictive control of asynchronous (or similar) motors in order to eliminate the aforementioned drawbacks and to introduce novel advantages to the related art.

It is possible to subdivide the MPC method within itself. One of the most widely used subdivisions is the "Finite-Control-Set Model Predictive Control (FCS-MPC)" method and the present invention has been developed for this subset.

An aim of the present invention is to provide a structure that allows the intense process load resulting from the MPC to be eliminated/alleviated.

Another aim of the invention is to provide a structure that ensures reduction in switching loss and thus an increase in yield by carrying out the present invention.

The present invention relates to the method of reducing estimation vectors in the model predictive control of the alternating current motors such as asynchronous motors in an attempt to achieve all objectives that will be more evident with the detailed description that is mentioned above and will be presented below.

In a preferred embodiment of the invention, all sector boundaries are shifted 30° forward with division of a $\alpha$-$\beta$ plane into sectors, which ensures a sector definition.

In another preferred embodiment of the invention, the selection of zero vectors is carried out by switching on and off switches of the phase which has the maximum current at the given moment.

DETAILED DESCRIPTION OF THE EMBODIMENTS

In this detailed description, the novelty of the present invention is disclosed by means of non-limiting examples in an attempt to ensure a better understanding of the subject.

In order to define the invention more accurately, the FCS-MPC method needs to be summarized first. Then, once the MPC method is mentioned, it should be noted that the FCS-MPC subset is of concern.

Figure 1:
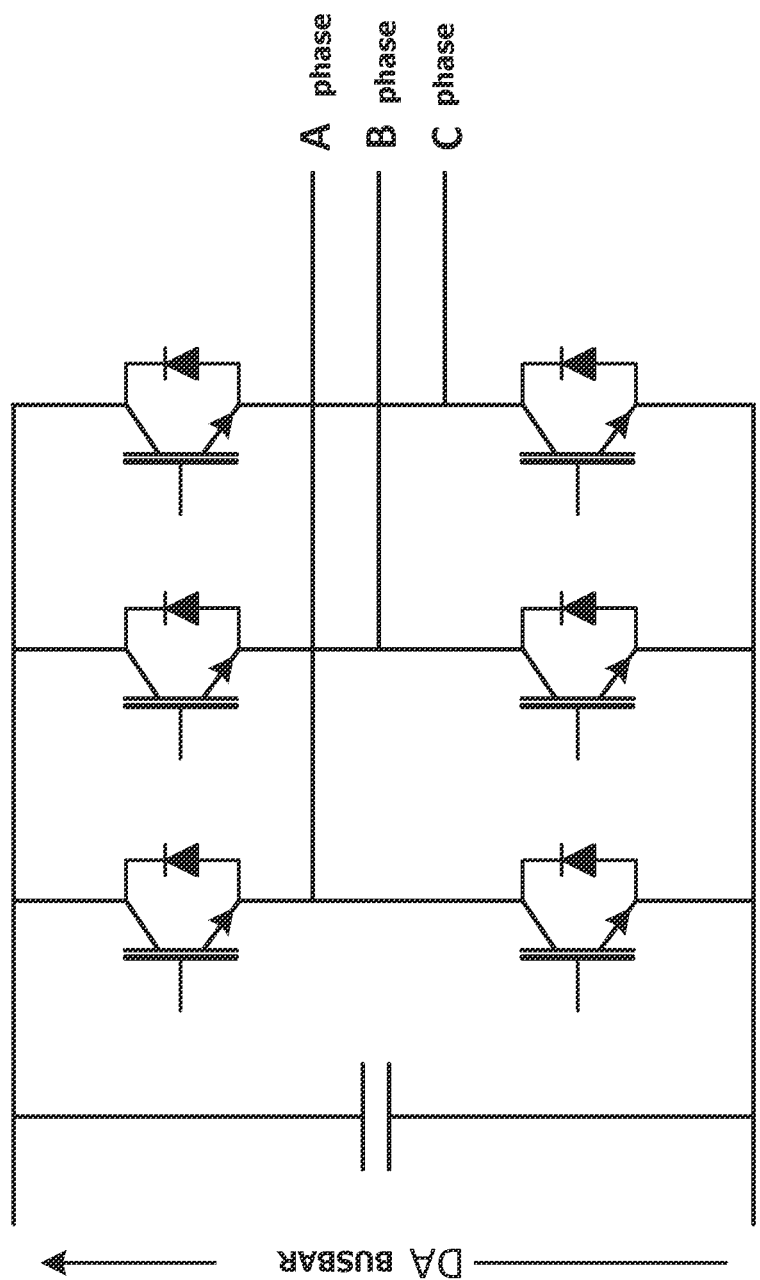
FIG. 1 represents the structure of 2L-VSI (Prior Art).
Figure 2:
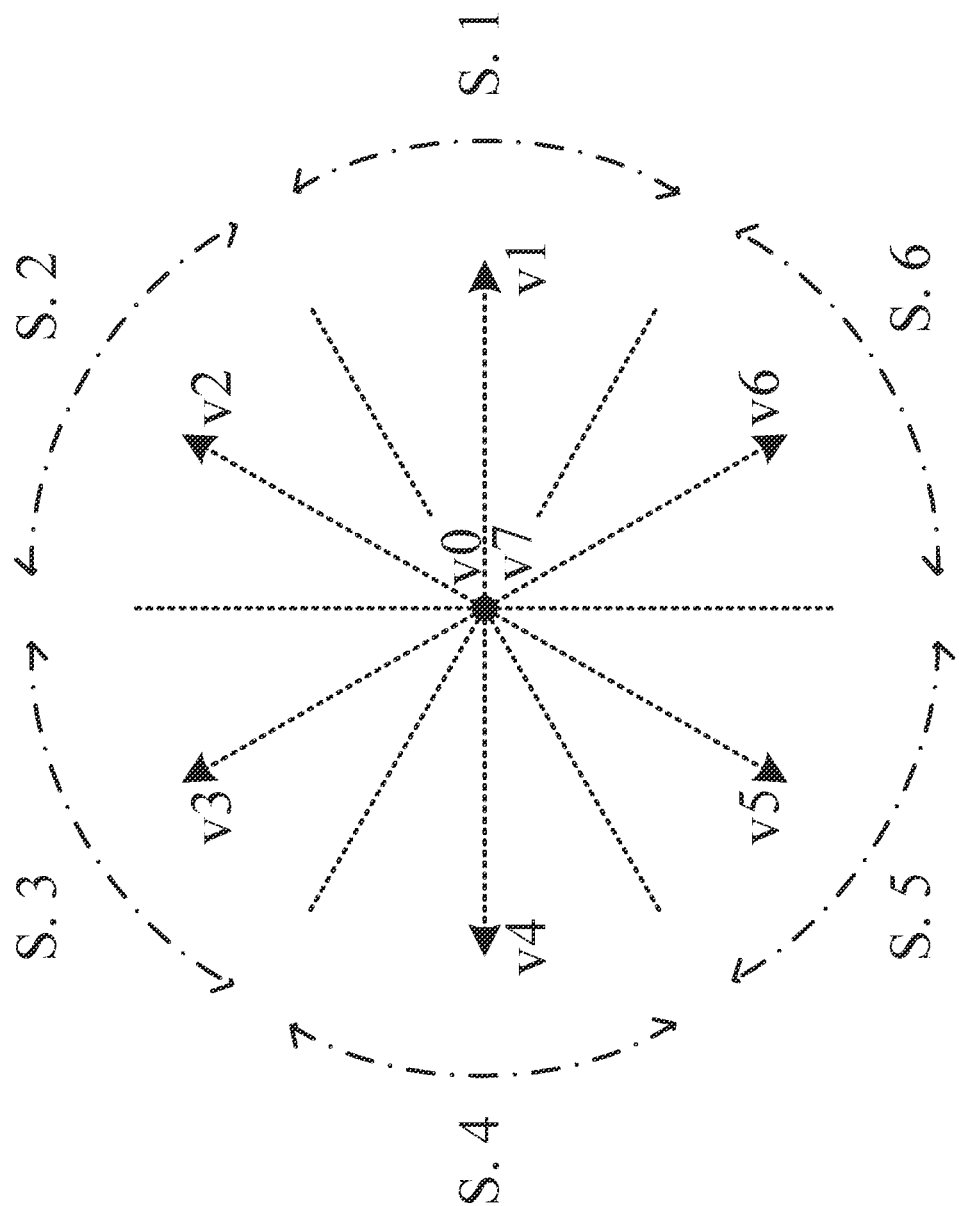
FIG. 2 shows the vectors that are likely to be generated by the 2L-VSI (Prior Art).

Now, we shall assume that an AA motor was driven by the 2L-VSI and the system was controlled by the MPC. All the combinations that are likely to be generated by the 2L-VSI (in other words, the vectors) are shown in FIG. 2. Six of these vectors (v1, v2, v3, v4, v5, v6) are active vectors and two (v0 and v7) are zero vectors. When paying attention, it can be seen that the plane on which the vectors are defined are also divided into six pieces (sectors) (S1, S2, S3, S4, S5, S6). The definition of this sector will be used for disclosing the present invention as well. In the MPC method, once one of the possible switching combinations (vectors) is applied, the effect that the same will generate on the system is calculated using a mathematical model. The compatibility of the effect to be made by every vector with control targets can be determined by a cost function. We shall continue with an example of a control of the AA motor: the performance of the driver can be evaluated based on to what extent it has been deviated from the torque (T) and flux (Ψ) values targeted. Accordingly, if a cost function is defined so as to be capable of calculating to what extent it has been deviated from the torque (T) and flux (Ψ) references targeted, once it is applied, the effect of every vector on the system will be accurately evaluated. A generic cost function that is used in motor drive applications with the MPC method is presented in an example (1).

$$g=|T_e^*(k)-T_e^P(k+1)|+\lambda||\Psi_s^*|-|\Psi_s^P(k+1)||\qquad(1)$$

In conclusion, after the effect of every vector on motor drive control targets is determined by a cost function, an optimum vector (having the minimum cost function, thus being determined such as to give the closest result with the control targets) is selected and applied. Cost functions are calculated for 7 vectors in total: 6 active (v1-v6) vectors and 1 zero vector (As vectors v0 or v7 are two possible combinations in creating the zero vector, the calculation of the effect to occur once it is applied can be carried out for one of them only). The vectors whose cost functions are to be calculated can be called "estimation vectors". A flow chart of such a control logic used in the conventional MPC method can be seen in FIG. 3.

Figure 3:
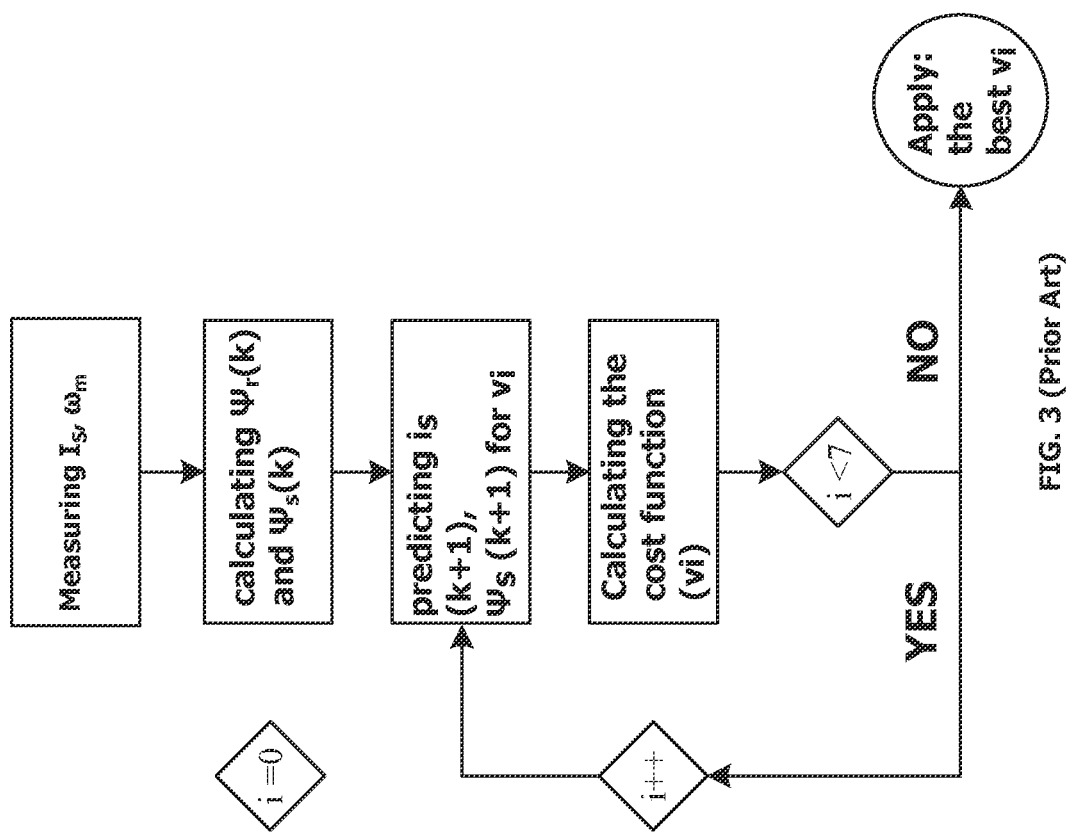
FIG. 3 shows a flow chart of the conventional MPC method (Prior Art).

The flow diagram of said control logic used in the conventional MPC method in FIG. 3 includes the following:
measuring $I_S$, $\omega_m$,
calculating $\Psi_r(k)$ and $\Psi_s(k)$,
predicting $i_s(k+1)$, $\Psi_s(k+1)$ for $v_i$,
calculating the cost function g ($v_i$),
repeating the same till i<7 is obtained in total,
if i<7 is not obtained
applying the best $v_i$.

The cost function is not concluded with a single process: firstly, the electrical quantities including rotor flux, stator flux, stator current are required to be predicted by use of a mathematical model of the system. It is evident that the MPC method summarized with its general operational logic demands a great deal of process load in this case. The need of such a high process is also put forward as one of the most significant drawbacks of the MPC method which has the potential of being a novel industrial standard due to its various favorable characteristics including an elastic structure easy to comprehend, a superior dynamic performance and a simple applicability to non-linear systems. The present invention purports to substantially diminish such a high process need by using various strategies of grouping and simplifying. The invention provides reduction of this process load for the MPC method by reducing the number of vectors of whose cost function is to be calculated. It has been determined that there would be no loss regarding the control performance in ignoring certain vectors under certain circumstances and said vectors would not be able to be the candidate optimum vector. Therefore, the cost function is calculated for 4 vectors only (3 active and 1 zero) and not for 7 vectors in total (6 active and 1 zero) with application of the algorithm that constitutes the present invention. In other words, the number of estimation vectors for the MPC method is reduced to 4 from 7. The vectors whose cost calculation is not made are automatically defined with an extreme cost and excluded from an optimum vector selection. In comparison to the conventional approach with seven vectors, this 4-vector approach has been called "reduced vector set". Which 4 vectors will be considered under which conditions and which ones will be ignored (in other words how the reduced vectors set will be determined) has been defined in a table.

Figure 4:
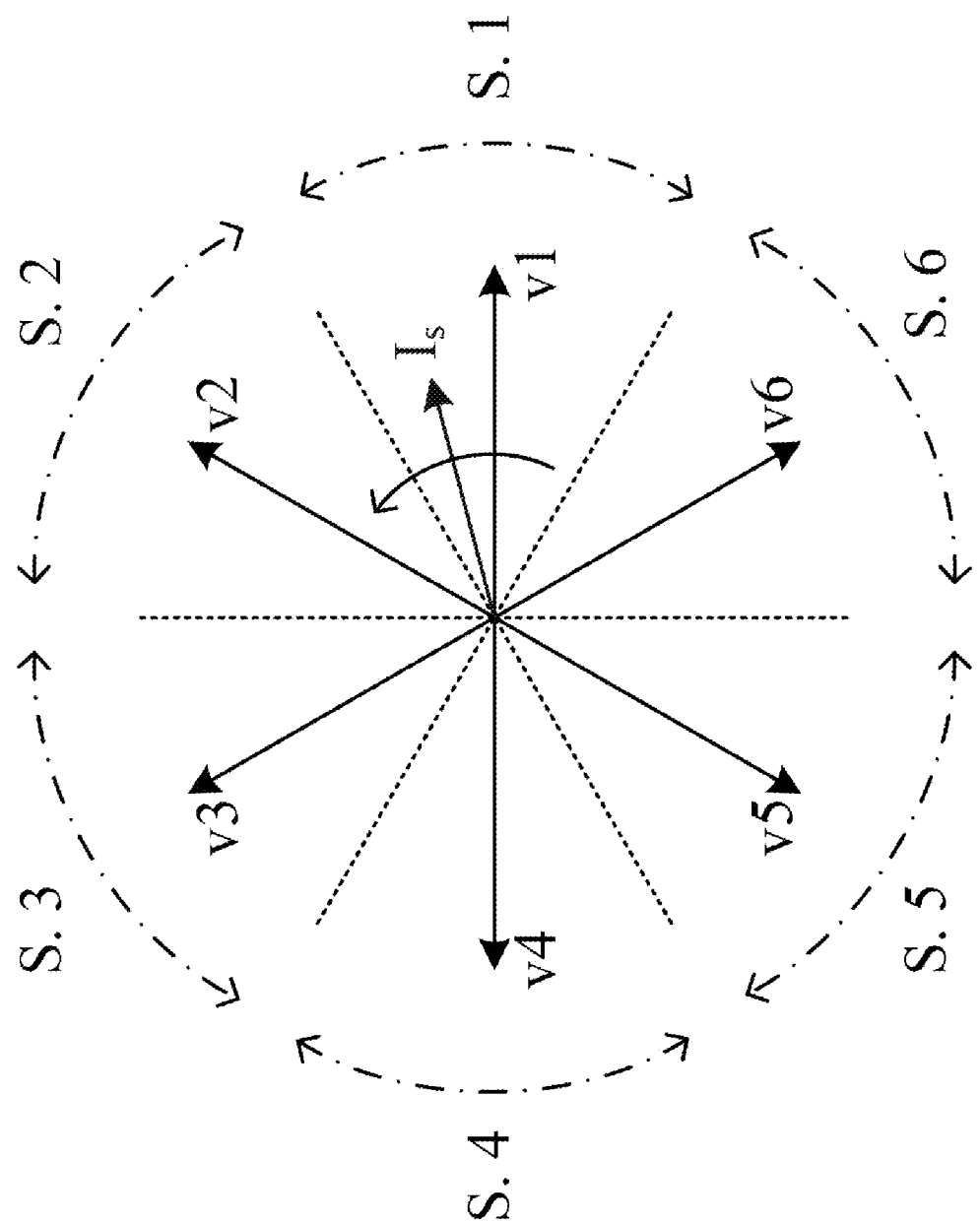
FIG. 4 shows an IS that rotates on the $\alpha$-$\beta$ plane.

For the aforementioned simplification, an observation is firstly carried out over the stator current vector ($I_S$). The vector ($I_S$) representing a resultant of stator currents can also be shown on the figure in which the vectors likely to be generated by the 2L-VSI are illustrated. It rotates on the plane (this plane is called plane α-β in literature) given in the $I_S$ in line with a rotation speed and direction of the motor and thus switches between the predefined sectors (S1, S2, S3, S4, S5, S6). This case is shown in FIG. 4. Another variable that defines the reduced vector set is "motor mode". Three different motor modes are defined: plus-directional rotation (FM, forward motor mode), minus-directional rotation (RM, reverse motor mode) and braking. Here, it is emphasized that the rotation direction may have two different values and which directions shall be defined as plus or minus is arbitrary. To which motor mode the requirements of the motor driver will correspond is determined with a method that can be described by means of the flow chart shown in FIG. 5. w, w*, T* represent speed, speed reference and torque reference, respectively in FIG. 5. The given multiplications are in fact aimed to determine the signs of the related quantities in relation to one another. There is no need for an actual multiplication and only the multiplication of the signs thereof is enough. Furthermore, the control of "low speed operation" given as a first step is only presented for smoothness of speed transitions and the method that has been proposed can be used without said step as well. The low speed zone has been used as ±15 rad/s for the model with a computer simulation and a zone of roughly one-tenth of the rated speed may be defined as the low speed zone. The motor mode desired from the driver can be determined by testing (by following YES or NO arrows) if the conditions are accurate, which are illustrated in a box in FIG. 5.

In conclusion, the method which has been proposed to determine the reduced vector set firstly answers the following two questions:

2—In which sector is the $I_S$ vector currently present? (FIG. 4)

Figure 5:
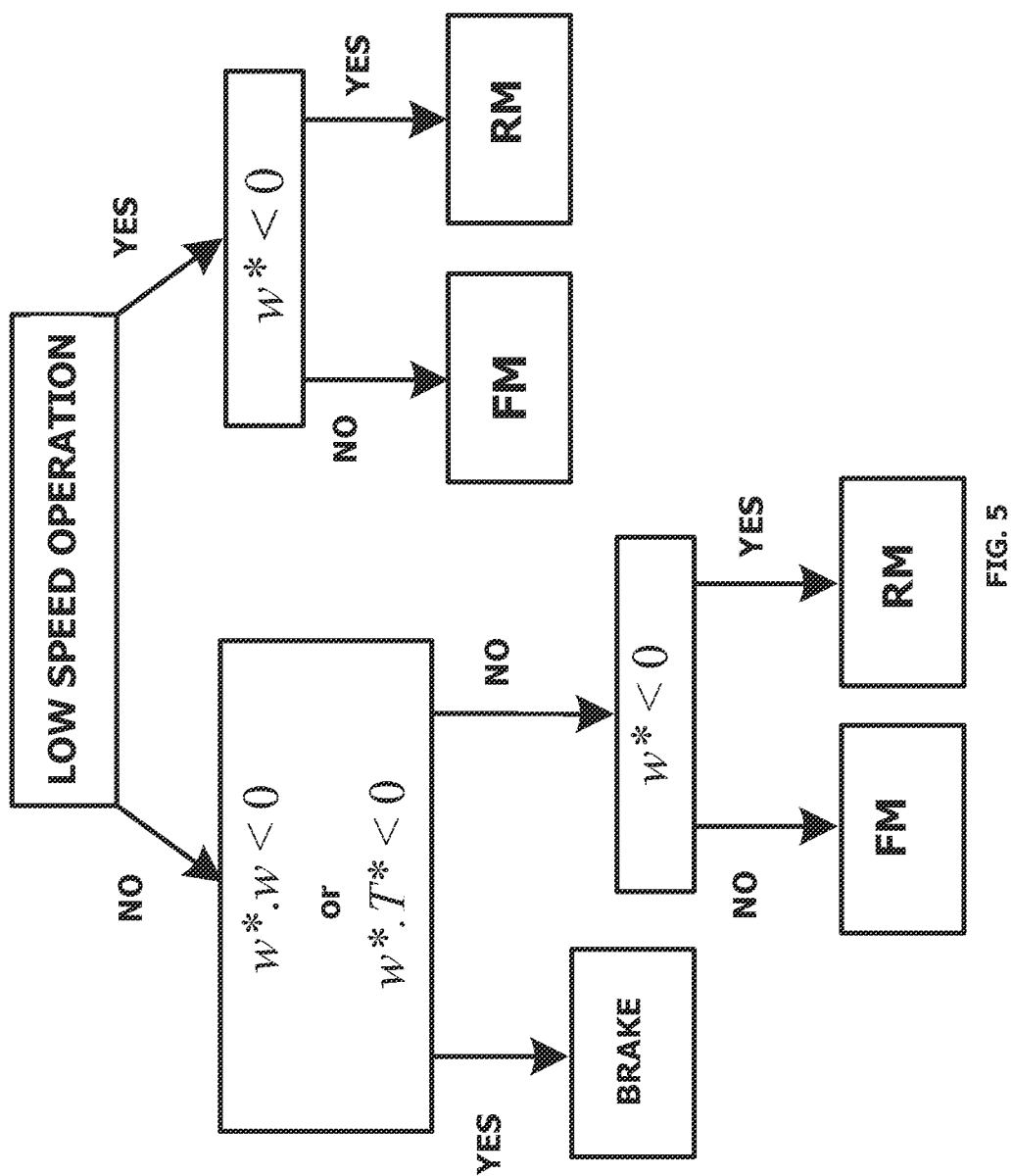
FIG. 5 shows a method for finding out a motor mode.

2—In which mode is the motor anticipated to operate? (FIG. 5)

By answering these two questions in accordance with the aforementioned description and the drawings illustrated, in other words, by determining the IS sector and the operational mode, a reduction in the vector set can be realized with reference to Table 1. Table 1 constitutes the essence of the present invention. As described, it can be seen that the number of the estimation vectors, which is 7 in total in the conventional MPC approach, is reduced to 4 estimation vectors in Table 1. In a nutshell, the present invention is a method that reduces 7 estimation vectors applicable to the MPC within the framework of a grouping logic to 4 and thereby enables the process load for the conventional MPC to be reduced.

TABLE 1

Reduction of the estimation vectors based on sector and operational mode.

|  | FM | RM | Braking |
|---|---|---|---|
| $S_1$ | $v_1\ v_2\ v_3\ v_7$ | $v_5\ v_6\ v_1\ v_7$ | $v_3\ v_4\ v_5\ v_7$ |
| $S_2$ | $v_2\ v_3\ v_4\ v_0$ | $v_6\ v_1\ v_2\ v_0$ | $v_4\ v_5\ v_6\ v_0$ |
| $S_3$ | $v_3\ v_4\ v_5\ v_7$ | $v_1\ v_2\ v_3\ v_7$ | $v_5\ v_6\ v_1\ v_7$ |
| $S_4$ | $v_4\ v_5\ v_6\ v_0$ | $v_2\ v_3\ v_4\ v_0$ | $v_6\ v_1\ v_2\ v_0$ |

TABLE 1-continued

Reduction of the estimation vectors
based on sector and operational mode.

| | FM | RM | Braking |
|---|---|---|---|
| $S_5$ | $v_5\ v_6\ v_1\ v_7$ | $v_3\ v_4\ v_5\ v_7$ | $v_1\ v_2\ v_3\ v_7$ |
| $S_6$ | $v_6\ v_1\ v_2\ v_0$ | $v_4\ v_5\ v_6\ v_0$ | $v_2\ v_3\ v_4\ v_0$ |

Selection of Zero Vector;

For the structure of 2L-VSI, two zero vector structures (v0 and v7) are provided, which will create zero voltage at the outcome. The effect of these on the system is completely the same. Which zero vector will be used in which case is another freeness aspect. The invention summarized in Table 1 performs the zero vector selection in the framework of logic. The zero vectors in the algorithm we have proposed are determined with an approach of not switching on or off the switches of the phase which has the maximum current at the given moment. Similarly, it is also possible to adopt a selection strategy of the zero vector which provides for minimizing the number of switching and such an approach is used in the conventional MPC method. A more generic variation of the invention proposed (regarding the zero vector selection) is defined in Table 2 with a reduction of the number of the estimation vectors.

TABLE 2

Reduction of the estimation vectors based on sector and operational
mode with a generalized selection of the zero vector.

| | FM | RM | Braking |
|---|---|---|---|
| $S_1$ | $v_1\ v_2\ v_3\ (v_7\ or\ v_0)$ | $v_5\ v_6\ v_1\ (v_7\ or\ v_0)$ | $v_3\ v_4\ v_5\ (v_7\ or\ v_0)$ |
| $S_2$ | $v_2\ v_3\ v_4\ (v_7\ or\ v_0)$ | $v_6\ v_1\ v_2\ (v_7\ or\ v_0)$ | $v_4\ v_5\ v_6\ (v_7\ or\ v_0)$ |
| $S_3$ | $v_3\ v_4\ v_5\ (v_7\ or\ v_0)$ | $v_1\ v_2\ v_3\ (v_7\ or\ v_0)$ | $v_5\ v_6\ v_1\ (v_7\ or\ v_0)$ |
| $S_4$ | $v_4\ v_5\ v_6\ (v_7\ or\ v_0)$ | $v_2\ v_3\ v_4\ (v_7\ or\ v_0)$ | $v_6\ v_1\ v_2\ (v_7\ or\ v_0)$ |
| $S_5$ | $v_5\ v_6\ v_1\ (v_7\ or\ v_0)$ | $v_3\ v_4\ v_5\ (v_7\ or\ v_0)$ | $v_1\ v_2\ v_3\ (v_7\ or\ v_0)$ |
| $S_6$ | $v_6\ v_1\ v_2\ (v_7\ or\ v_0)$ | $v_4\ v_5\ v_6\ (v_7\ or\ v_0)$ | $v_2\ v_3\ v_4\ (v_7\ or\ v_0)$ |

While the basic approach of grouping remains the same, the present invention has been developed in conjunction with a series of variations. For instance, a diagram of reducing an estimation vector can be seen in Table 3, which is capable of being realized by taking only the rotational direction of the motor into consideration, without using the motor mode illustrated in FIG. 5. When compared to the basic structure of the invention described above, it is more advantageous as it is not firstly required to apply the method of FIG. 5 for a reduction in the number of estimation vectors, but more disadvantageous as it has a number of estimation vectors with one figure more (not 4 but 5). Similarly, division of the plane α-β shown in FIG. 4 into sectors may be performed in various ways. It is determined that the invention can also be operated with a sector definition to be made by shifting all sector boundaries 30° ahead.

TABLE 3

Reduction of estimation vectors which can be performed
only by considering the rotational direction thereof.

| | FM | RM |
|---|---|---|
| $S_1$ | $v_1\ v_2\ v_3\ v_5\ v_7$ | $v_5\ v_6\ v_1\ v_3\ v_7$ |
| $S_2$ | $v_2\ v_3\ v_4\ v_6\ v_0$ | $v_6\ v_1\ v_2\ v_4\ v_0$ |
| $S_3$ | $v_3\ v_4\ v_5\ v_1\ v_7$ | $v_1\ v_2\ v_3\ v_5\ v_7$ |
| $S_4$ | $v_4\ v_5\ v_6\ v_2\ v_0$ | $v_2\ v_3\ v_4\ v_6\ v_0$ |
| $S_5$ | $v_5\ v_6\ v_1\ v_3\ v_7$ | $v_3\ v_4\ v_5\ v_1\ v_7$ |
| $S_6$ | $v_6\ v_1\ v_2\ v_4\ v_0$ | $v_4\ v_5\ v_6\ v_2\ v_0$ |

To sum up the operation of the present invention with reference to the detailed description mentioned above and below, it can be said that reduction in the process load has been achieved by ensuring a reduction in the estimation vectors of the invention. For this aim, two basic parameters are firstly determined. The first one of these is the sector in which vector $I_S$ is currently present. The second one is to which motor mode the requirements of the motor driver correspond: plus-directional rotation (FM, forward motor mode), minus-directional rotation (RM, reverse motor mode) and braking. With these given two parameters, the simplification of the estimation vectors represented in Table 1 is performed. Ultimately, the cost function is calculated not for 7 vectors (6 active and 1 zero) but only for 4 vectors (3 active and 1 zero) in total. The vectors whose cost calculations are not made are automatically defined with a great amount of cost and excluded from vector selection. In another embodiment of the invention, division of the plane α-β into sectors means a sector definition to be performed by shifting all sector boundaries 30° ahead. In a further embodiment of the invention, reduction of the estimation vectors is carried out only by taking the rotational direction of the motor into consideration, without using the method of determining the motor mode.

With reference to the aforementioned detailed description, the present invention is the method of reducing the estimation vectors in the model predictive control of the alternating current motors, characterized by comprising the following steps of;

determining sector location by switching between the resultant of stator currents (IS) and the predefined sectors S1, S2, S3, S4, S5, S6 for reducing process load in the cost function, determining the motor mode in order to find out to which motor mode the requirements of the motor driver correspond during determining the sector location, reducing 7 (6 active and 1 zero) estimation vectors to 4 (3 active and 1 zero) and calculating the same depending on this sector data and the motor mode data determined, or reducing 7 (6 active and 1 zero) estimation vectors to 5 (4 active and 1 zero) and calculating the same only by taking the rotational direction of the motor into consideration without using the method of determining the motor mode.

What is claimed is:

1. A method of reducing estimation vectors in a model predictive control of alternating current motors, comprising the following steps:

determining at which one of predefined sectors a resultant of stator currents is present in order to enable a process load in a cost function to be reduced to provide sector data, determining a motor mode corresponding to requirements of a motor driver during determining a sector location to provide motor mode data, reducing seven estimation vectors, wherein seven estimation vectors comprise six active estimation vector and one zero estimation vector, to four estimation vectors, wherein the four estimation vectors comprise three active estimation vectors and one zero estimation vector, and calculating the cost function depending on the sector data and the motor mode data determined, or reducing the seven estimation vectors, wherein seven estimation vectors comprise six active estimation vector and one zero estimation vector, to five estimation vectors, wherein the five estimation vectors comprise four active estimation vectors and one zero estimation vector, and calculating the cost function only by taking a rotational direction of a motor into consideration without using the step of determining the motor mode.

2. The method according to claim 1, wherein a sector definition is carried out by shifting sector boundaries 30° forward with a division of a plane $\alpha\text{-}\beta$ into sectors.

3. The method according to claim 1, wherein a selection of zero estimation vectors is performed by not switching on or off switches of a phase, wherein the phase has a maximum current at a given moment.

* * * * *